United States Patent [19]

Stoner et al.

[11] 4,384,943
[45] May 24, 1983

[54] FLUID TREATMENT

[75] Inventors: Glenn E. Stoner; Louie L. Scribner, Jr.; George L. Cahen, Jr., all of Charlottesville, Va.

[73] Assignee: The University of Virginia Alumni Patents Foundation, Charlottesville, Va.

[21] Appl. No.: 185,733

[22] Filed: Sep. 11, 1980

[51] Int. Cl.³ .............................................. C02F 1/46
[52] U.S. Cl. .................................................. 204/149
[58] Field of Search ............... 204/149, 151, 152, 186, 204/180 R, 275, 260, 268, 237; 317/262 AE

[56] References Cited

U.S. PATENT DOCUMENTS

| | | | |
|---|---|---|---|
| 943,188 | 12/1909 | Hartman | 204/149 X |
| 1,507,121 | 9/1924 | Landreth | 204/149 |
| 1,956,411 | 4/1934 | Bonone | 204/149 X |
| 2,046,467 | 7/1936 | Krause | 204/149 X |
| 2,887,444 | 5/1959 | Lindstaedt | 204/152 |
| 3,076,754 | 2/1963 | Evans | 204/237 |
| 3,192,142 | 6/1965 | Vellas et al. | 204/149 |
| 3,305,472 | 2/1967 | Oldershaw et al. | 204/268 |
| 3,336,220 | 8/1967 | Neidl | 204/149 X |
| 3,340,175 | 9/1967 | Mehl | 204/268 |
| 3,600,286 | 8/1971 | Sabins | 204/149 |
| 3,654,534 | 4/1972 | Fischer | 317/262 AE |
| 3,725,226 | 4/1973 | Stoner | 204/149 |
| 3,753,886 | 8/1973 | Myers | 204/186 |
| 3,769,196 | 10/1973 | Wikey | 204/275 |
| 3,891,535 | 6/1975 | Wikey | 204/275 |
| 3,923,629 | 12/1975 | Shaffer | 204/260 |
| 4,048,030 | 12/1975 | Miller | 204/149 |

*Primary Examiner*—T. M. Tufariello
*Attorney, Agent, or Firm*—Leblanc, Nolan, Shur & Nies

[57] ABSTRACT

Methods and apparatus for electrochemically disinfecting or treating contaminated aqueous liquids by contact disinfection and/or the generation of a biocidally active chemical agent in the liquid being treated. Rapid polarization of reactor electrodes after polarity reversal and out-of-phase operation of paired reactors can be employed to promote efficient disinfection, reduce the bulk of the apparatus, and protect the reactor electrodes against damage.

10 Claims, 6 Drawing Figures

FLUID TREATMENT

The invention herein described was in part made in the course of or under a contract or subcontract thereunder, (or grant) with the United States Navy.

The present invention relates to the treatment of aqueous fluids and, more particularly, to novel, improved methods and apparatus for electrochemically eliminating harmful and other unwanted organisms from aqueous fluids contaminated with such organisms.

Our invention can be employed in shipboard seawater sewage systems, for swimming pool disinfection, to purify biologically contaminated industrial process streams, to inhibit the growth of algae, and for a variety of other purposes. Consequently, to the extent that they are not expressly excluded from the appended claims, the foregoing and other applications of our invention are fully intended to be embraced by those claims.

Electrochemical processes for neutralizing or destroying pathogenic organisms in aqueous fluids are well-known and are discussed in some detail in U.S. Pat. No. 3,725,226 issued Apr. 3, 1973, to Stoner for ELECTROCHEMICAL INACTIVATION OF PATHOGENS.

Typically, in a process of the type just identified, contaminated aqueous fluid is caused to flow between two electrodes across which an appropriate voltage is impressed. The unwanted organisms are adsorbed onto the anode and inactivated or rendered harmless by a contact process which appears to involve oxidation reactions and the giving up of electrons by the organisms.

In one respect our novel process for treating aqueous fluids differs from that disclosed by Stoner in that we generate in the fluid being treated a biocidally active chemical which is effective to neutralize unwanted organisms in the fluid being treated. This is done by maintaining in the fluid a compound that is electrolytically decomposable to yield bromine, chlorine, or perhaps iodine and/or by decomposing water being treated to produce biocidally active $O_2$ or $O_3$ oxidants.

The biocidal effects of peroxides and other species of oxygen such as ozone are well-known.

In our novel apparatus both the in situ generation of such disinfectants by the in situ decomposition of the fluid being treated and the electrochemical adsorption and destruction of organisms (or contact disinfection) can be simultaneously accomplished, a decided benefit because advantage can be taken of the attributes of both techniques—the potency of contact disinfection and the long-lasting effect of the $O_2$ or $O_3$ disinfectant.

The use of chlorine to disinfect swimming pools, drinking water, etc. is well-known as are the biocidal properties of iodine. U.S. Pat. No. 3,305,472 issued Feb. 21, 1967, to Oldershaw et al for PURIFYING WATER WITH BROMINE points out that bromine can be used for water purification in swimming pool and other applications. Oldershaw et al propose to produce this reagent by electrolytically decomposing an appropriate bromine compound in situ in the water being treated.

In our novel apparatus both the in situ generation of a biocidally active halogen and contact disinfection can also be simultaneously accomplished. Again, this is a decided benefit because advantage can be taken of the attributes of both the potency of contact disinfection and the long-lasting effect of the halogen disinfectant.

In applications such as shipboard sewage systems, appropriate saline compounds are already present in effective amounts. Suitable compounds can readily be added as to the influent in swimming pool and other applications where they are not initially present.

Generation of a halogen disinfectant or biocide is often important. Contact disinfection in apparatus of the type described above is not an instantaneous process even though it is extremely potent, and disinfection by electrolytically generated oxidants may not suffice to neutralize the remaining unwanted organisms. In such circumstances the halogen reliably completes the disinfection process.

By liberating sufficient halogen in the fluid being treated (typically at least 1 to 1.2 ppm of free available chlorine in the case of swimming pool water), an environment is established in which disinfection occurs for many minutes after the fluid is discharged from the electrochemical cells of the treatment system in comparison to the few seconds in which contact disinfection may occur.

As the treatment process proceeds in systems of the character just described, chemical fouling occurs by virtue of oxidation reactions at the electrode serving as an anode and reduction reactions as that electrode acting as the cathode. Biological fouling by a build-up of the neutralized organisms on that electrode onto which they are adsorbed also occurs.

Efficiency suffers as a consequence of both chemical and biological fouling.

Excessive biological fouling can be avoided by periodically reversing the polarity of, and the direction of flow of electrical current between, the electrodes.

The fouled electrode thereupon becomes the cathode. As pointed out in the Stoner patent, hydrogen is generated at the cathode; and it displaces the inactivated, adsorbed organisms, thereby effecting what Stoner terms a biological "defouling" of that electrode.

Chemical fouling is concomitantly eliminated by the periodic reversal of polarity and direction of current flow. This reverses the character of the reactions which occur at the respective anodes (oxidation to reduction and vice versa). This is important in applications involving biocidally active halogens because the chemical species existing at the electrode which becomes an anode upon polarity reversal are much more readily oxidized than the halogen of the oxidant liberating compound in the aqueous fluid being treated. Consequently, oxidation of those reduced chemical species in the vicinity of the electrode must be accomplished before liberation of the halogen can proceed.

A finite time is also required after a reversal of polarity and current flow before the then cathode can be charged in the opposite direction to the potential at which it is capable of functioning as an anode for our purposes. During this "polarization" or dead time, disinfection or neutralization does not occur to the wanted extent.

Our novel fluid treatment systems and techniques furnish two solutions to this problem.

First, during polarization, we increase current flowing between the electrodes of the disinfection cells in such a manner that the electrodes are polarized much more rapidly than has heretofore been the case. Thereafter, the voltage is maintained at the desired level of polarization, and the current is simply allowed to vary inversely with cell resistance. Alternatively, when polarization is achieved, the current may be stepped down to a lower, constant level and the voltage allowed to vary proportionally with cell resistance at a voltage approximating the desired level of polarization.

By thus effecting rapid polarization and then allowing the current (or voltage) to vary while the other of those parameters is maintained constant or otherwise controlled, the cells are capable of effecting disinfection or neutralization by both contact disinfection and by contact with an electrolytically generated biocide over a greater portion of the period or cycle ending with reversal of polarity and current flow than has heretofore been the case.

The second of our solutions to the problem of eliminating the dead time during polarization is to connect two reactors in series and to supply electrical power to the two reactors in the same manner but out-of-phase. This ensures that at least one of the reactors will always be capable of effecting organism neutralization or destruction and that the apparatus as a total entity will not have any dead time.

Another above suggested advantage of our novel apparatus and techniques for electrochemically destroying and inactivating, or otherwise neutralizing, harmful or unwanted organisms by contact disinfection is that we can carry that out while maintaining the parameters (potential and current density) which are effective to decompose bromine salts and liberate biocidally active free bromine in the water being treated. We can, in this same manner, liberate other halogen biocides in the water being treated to purify it or otherwise electrolytically generate a biocidally active specie in the water. In fact, in swimming pool and other applications where high solids contents are not involved, disinfection via liberation or generation of a biocide or disinfectant in the liquid being treated can replace contact disinfection as the primary neutralization mechanism.

Other advantages of our invention, attributable principally to rapid polarization and the utilization of a larger part of the wave form (or power supply cycle) for fluid treatment, are that our equipment is more efficient, more compact, and less expensive in terms of capital investment and operating costs.

Longer service life of the electrodes is also obtained, and we can furthermore treat fluids which are corrosive and high in solids content.

A corollary advantage is that we can employ electrodes which are much less expensive than the noble or precious metal electrodes heretofore commonly used in comparable electrochemical apparatus.

From the foregoing, it will be apparent to the reader that one important and primary object of our invention resides in the provision of novel, improved methods and apparatus for electrochemically neutralizing harmful or otherwise unwanted organisms contaminating aqueous fluids.

A further, important, and primary object of the present invention resides in the provision of novel, improved electrochemical techniques and systems for treating aqueous fluids which are more efficient, less expensive to construct and operate, and more conserving of electrical energy than those heretofore available.

A related, also important object of the invention resides in the provision of novel, improved electrochemical fluid treatment techniques and systems in which dead time is minimized if not entirely eliminated.

Another important and related object of our invention resides in the provision of processes and systems of the character just described in which the voltage across the electrodes is periodically reversed but in which polarization of the electrodes to an operable level is effected much more rapidly than in heretofore proposed systems and in which a greater part of each period ending in the reversal of potential can be employed for disinfection.

Yet another important, primary object of our invention is the provision of electrochemical fluid treatment techniques and systems capable of treating fluids which have a high solids content and/or which are more corrosive than can be handled by existing equipment.

And still another important and primary object of the present invention is the provision of electrochemical fluid treatment processes and systems which are capable of neutralizing or destroying harmful organisms both by a potent contact disinfection of those organisms and by liberating in situ a chemical reagent which is capable of neutralizing or destroying such organisms in the water being treated over a longer period than is available for contact disinfection.

Other important objects and features and additional advantages of our invention will become apparent from the appended claims and as the ensuing detailed description and discussion proceeds in conjunction with the accompanying drawing, in which:

Figure 1:
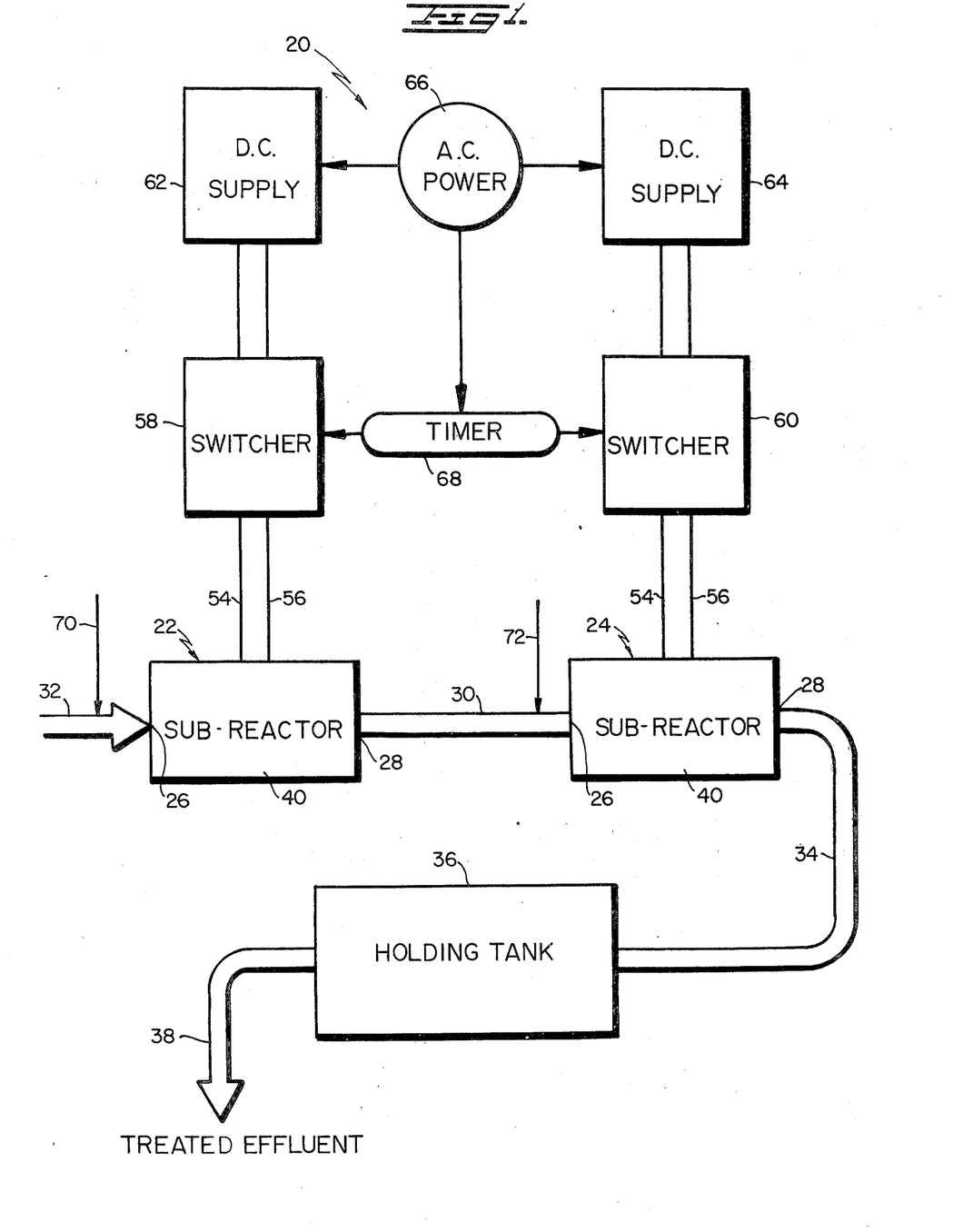
FIG. 1 is a block diagram of a fluid treatment system employing, and constructed in accord with, the principles of the present invention.

Referring now to the drawing, FIG. 1 depicts a system 20 for neutralizing or destroying harmful or other unwanted microorganisms in aqueous fluids in accord with the principles of the present invention.

The major components of system 20 are reactors or sub-reactors 22 and 24 each having an inlet 26 and an outlet 28. Reactors 22 and 24 are typically incorporated into a single package 29 (see FIG. 2), and they are connected in series by a conduit 30.

The fluid to be treated is introduced into the first of the two reactors 22 through a conduit 32, and the treated fluid is discharged from the second of the two reactors 24 through a conduit 34.

In the illustrated system, which is designed for shipboard sewage treatment, the treated fluid flows from conduit 34 into a holding tank 36 where disinfection is completed by contact with a biocidally active halogen generated in situ from salts in the seawater as described above and by decomposition of the water being treated to generate biocidally active oxygen. The treated fluid can be dumped overboard through conduit 38.

In other applications, such as the treatment of swimming pool water, for example, the treated fluid is instead recirculated.

Figure 2:
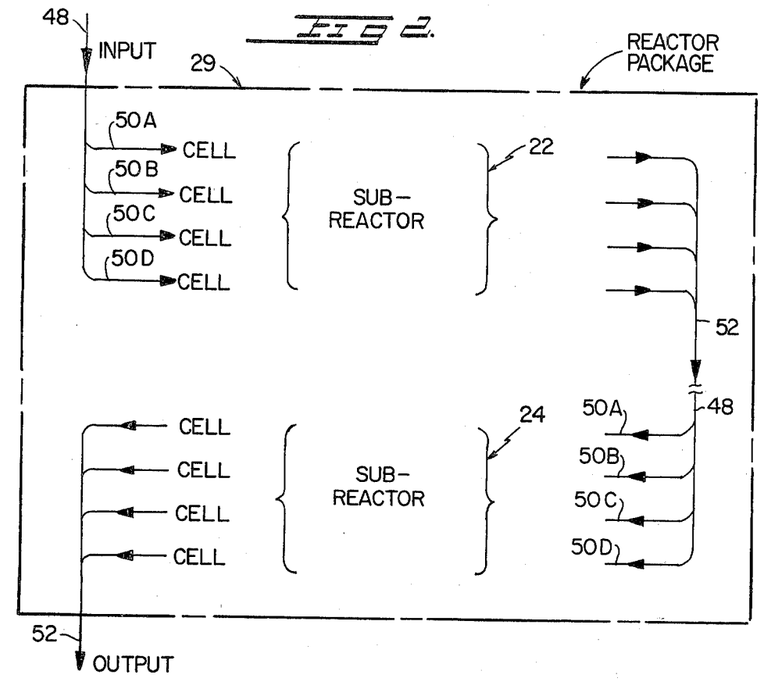
FIG. 2 is a flow diagram for the system of FIG. 1.
Figure 3:
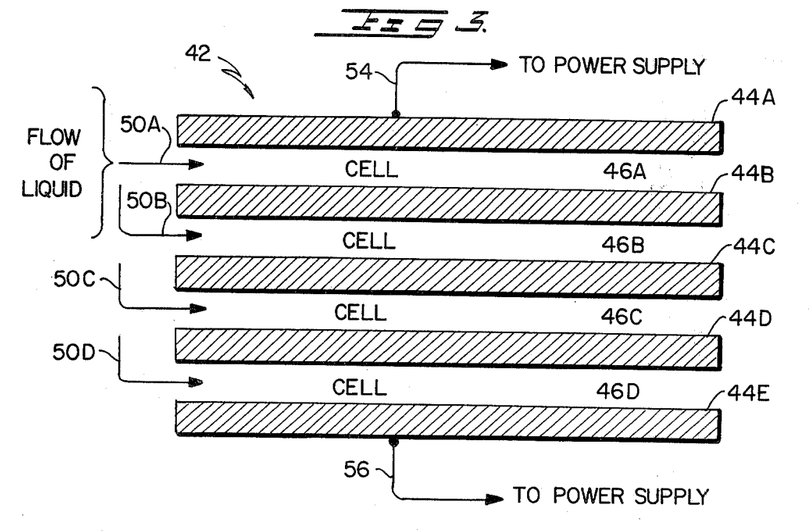
FIG. 3 is a generally schematic illustration of one of two essentially identical sub-reactors which are part of the FIG. 1 system.

Referring now to FIGS. 2 and 3 as well as FIG. 1, each of the reactors 22 and 24 includes a tank 40 in which an array 42 of electrodes 44A-44E is housed. These electrodes, which have rectangular, plate-like configurations, are disposed in parallel, spaced apart relationship and oriented so that they extend from the inlet 26 toward the outlet 28 of the reactor in which they are incorporated.

This divides the interior of each reactor into four, parallel flow paths or cells 46A-46D defined, respectively, by electrode pairs 44A and B, 44B and C, 44C and D, and 44D and E.

As shown diagrammatically in FIG. 2, the fluid 48 flowing into each of the reactors is divided into four streams 50A-D, one of these streams flowing through each of the cells 46A-46D. At the outlet side of each reactor, these four streams are recombined into a single stream 52.

The preferred electrode materials are disclosed in U.S. patent application Ser. No. 935,155 filed Aug. 1, 1978, by Glenn E. Stoner et al and entitled "Electrolysis Electrode". Those electrodes are composites of conductive, carbon fibers dispersed in a non-conductive, polymeric matrix. Among the polymers that are suitable are epoxies, polyamides, various polyesters, polyphenylene sulfides and oxides, and polysulfones.

A decided advantage of the preferred electrodes, aside from those discussed in the Stoner et al application, is that they are corrosion resistant in seawater. Comparable and compatible, extended service lives can be obtained by fabricating the reactor tanks or shells, the conduits, and other components contacted by the fluid being treated of stainless steel, plastics, or other corrosion resistant materials or by employing appropriate coatings, a number of which are commercially available.

An electrical potential is maintained across each of the cells 46A-D in reactors 22 and 24 by connecting the outermost electrodes 44A and 44E in each of the two arrays 42 by leads 54 and 56 through a switcher 58 or 60 to a D.C. power supply 62 or 64 which may be a Sorenson Model No. SRL 20-12 or an Adtech Power Brute I, for example. Both have constant voltage and constant current operating modes with adjustable outputs and an automatic crossover capability that causes the unit to automatically transfer from one mode to the other as load requirements change.

As shown in FIG. 1, the two D.C. power supplies are connected to an A.C. power source 66 in the illustrated, exemplary embodiment of our invention.

With the power supplies 62 and 64 energized, a D.C. potential is established across each of the fluid treatment cells 46A-46D in reactors 22 and 24 and between the electrode pairs 44A and B, etc. bounding those cells. Microorganisms in fluid flowing through the cells are neutralized by contact disinfection and by contact with biocides generated by electrolytic decomposition of salts in the seawater carrier of the sewage being treated and/or by biocidally active forms of oxygen generated by in situ decomposition of the water being treated.

To accomplish this, the potential across each electrode array 42 is maintained in the range of 14–16 volts, which means that the potential across each cell 46A-D or between the pair of electrodes defining it is in the range of 3.5 to 4.4 volts. The current density is kept in the range of 0.01 to 0.016 amp/cm$^2$ in this and comparable applications of our invention.

The foregoing are residual values; i.e., the values existing after polarization is effected.

Operation under these parameters is effective and also relatively economical as the power consumption is only 0.5 to 0.75 kilowatt hours per 1,000 gallons of fluid treated.

As treatment of the fluid being processed proceeds, the electrodes become biologically and chemically fouled. The biological material can be dispersed or displaced from the anode-serving electrode and the latter whereby defouled by reversing the polarity of the potential across the cells in reactors 22 and 24.

In the illustrated, exemplary system 20 this is automatically accomplished by a timer 68 connected to switchers 58 and 60. Timer 68 is set for the desired interval; and, at the end of each such interval, it actuates the appropriate switcher 58 or 60. The switcher thereupon reverses the electrical connections between the associated reactor 22 or 24 and its power supply 62 or 64.

The switchers need be nothing more than relays with two sets of contacts so wired that current will flow in one direction when the relay solenoid is energized and in the opposite direction when it is deenergized. In switchers of this type just described, energization and deenergization of the solenoids is controlled by timer 68. The connections are simple and conventional and have accordingly not been shown.

Chemical fouling is also eliminated by the reversal of polarity via the reversal of oxidation and reduction reactions discussed above.

The frequency with which polarity reversal is effected is dependent upon the rapidity with which fouling occurs. To keep fouling to a level compatible with the level of efficiency we consider necessary, the reversal of polarity is effected once every 150 to 300 seconds; i.e., every 2.5 to 5 minutes.

Figure 4:
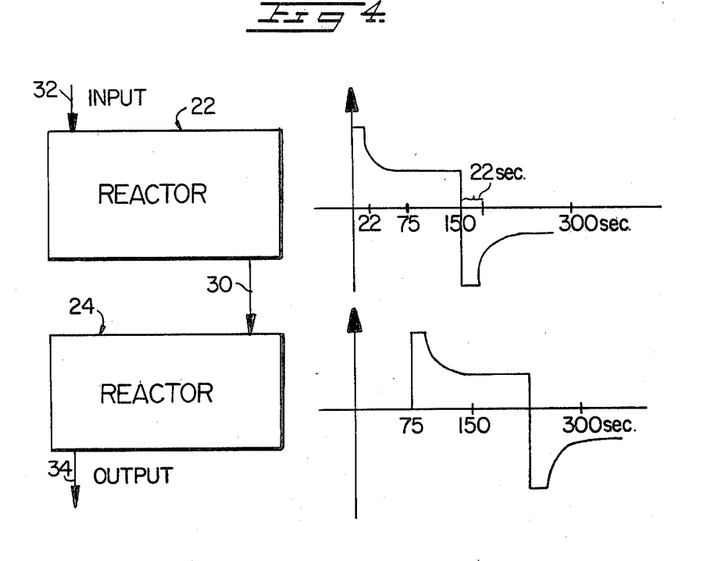
FIG. 4 is a timing diagram showing the out-of-phase operating relationship of the sub-reactors.
Figure 5:
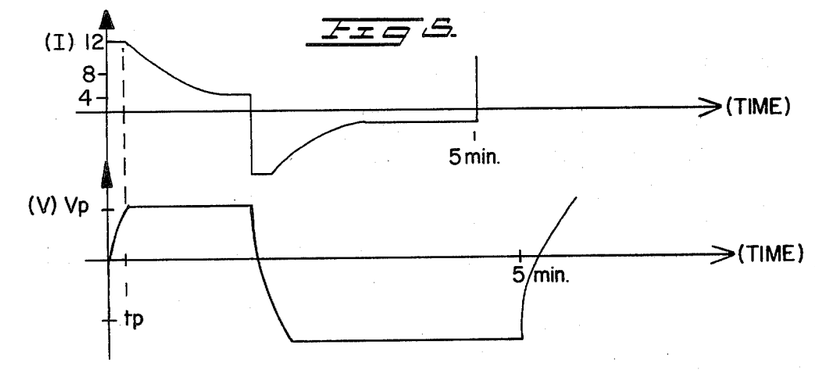
FIG. 5 shows the current and voltage wave forms for one mode of operation of the FIG. 1 system in which, after initial polarization, voltage across the reactors cells is maintained constant and current allowed to vary in inverse proportion to cell resistance.
Figure 6:
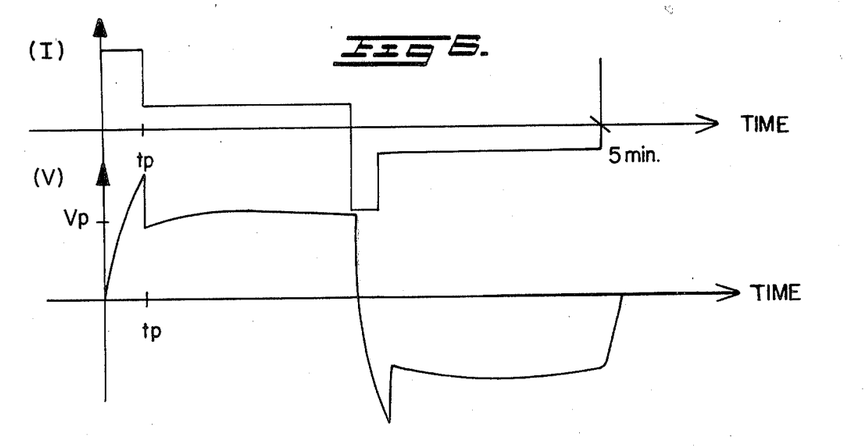
FIG. 6 is a similar diagram showing an alternate mode of operation in which, after initial polarization, the current is stepped down and the voltage across the reactor cells allowed to similarly vary.

Referring now to FIGS. 4–6 of the drawing, the electrodes must be polarized upon a reversal of polarity before the neutralization of organisms can be resumed. That is, a finite time after the reversal of polarity is required to build up the potential across each cell to the level where it becomes effective for our purposes, i.e., to produce contact disinfection and liberate the halogen disinfectant and/or generate biocidally active oxygen. One of the important features of our invention is that we can minimize, or even eliminate, the polarization period or dead time, thereby making systems in accord with the principles disclosed herein more efficient than those heretofore proposed in that a greater portion of the period between polarity reversals can be employed for neutralization of unwanted organisms.

We effect this desirable, rapid polarization (or repolarization) by, at the time polarity is reversed, increasing the current flow between the electrodes bounding each cell to a level substantially above that needed to maintain the potential across the cell at the level required for the neutralization of microorganisms.

Specifically, as discussed above, an adequate voltage level for organism neutralization can be insured by maintaining a current density in the 0.01 to 0.016 amp/cm$^2$ range in the applications involving highly saline solutions such as seawater (10,000 to 20,000 ppm or 1 to 2 percent). To insure rapid polarization, we adjust the power supply 62 or 64 manually, or automatically, to generate an increased current density (see FIGS. 5 and 6) of 0.03 to 0.05 amps/cm$^2$. The current flow is maintained at this level for a period of 1 to 45 seconds, and it is then reduced to the level indicated above.

Repolarization time is a function of current density and the concentration of biocide in the liquid being treated. Minimum conditions at which rapid repolarization is advantageous are in the neighborhood of 9.5 milli-amps/cm$^2$ and 300 ppm of halogen compound, for example. In such applications a repolarization current of three amps increased from a residual current of one amp can cause repolarization to occur in a matter of 10 milliseconds.

On the other hand, rapid repolarization is important at much different salinities if the current density is higher or lower. Flow rates and the surface conditions of the electrodes can also effect the circumstances under which rapid repolarization is an asset. As examples, flowing water can strip electrochemically generated species from the electrodes, reducing chemical fouling and repolarization times, while this effect can be inhibited by roughened electrode surfaces.

In any event, the leading edge of the voltage waveform will preferably approximate that of a square wave as shown in FIGS. 5 and 6. That rapid repolarization as we define it has the advantages discussed above is entirely unexpected in view of the statement in the Stoner patent that a square-shaped waveform is "generally less effective" than a saw-toothed or sinusoidal one.

Another important advantage of our novel, just-discussed repolarization technique, mentioned above, is the increased electrode service life this provides.

We identified above the electrodes we prefer and a number of advantages they possess. Another is that they are relatively inexpensive.

Absent rapid repolarization, however, such electrodes are not usable in the apparatus disclosed herein. Subjected to a D.C. voltage of the magnitude we employ without rapid repolarization, exemplary electrodes of the character described in the Stoner et al application deteriorated to an unservicable condition in ca. 48 hours. Periodic (150 to 300 second) repolarization extended the life of such electrodes without noticeable loss of effectiveness to an extent which is acceptable and has not been determined because the tested electrodes are still servicable.

As shown in FIG. 5, voltage control can be employed to maintain the residual potential across the treatment cells at the required level with the current simply being allowed to vary in proportion to cell resistance. Alternatively, as shown in FIG. 6, the same result can be accomplished by stepping down and controlling the residual current flow between the electrodes bounding the cells, allowing the voltage to similarly vary at about the selected level.

In the exemplary embodiment of our invention illustrated in the drawing and described above, the dead time in which there is no disinfection or neutralization of unwanted microorganisms is not only minimized in each reactor as just described but is entirely eliminated considering system 20 as an entity. This is accomplished by phasing the polarity reversals in the two reactors 22 and 24 as shown in FIG. 4 so that one reactor is operating in the disinfection or neutralization part of its cycle while the electrodes of the second reactor are being polarized. Preferably, as is also shown by the timing diagrams in FIG. 4, the operating cycles of the two reactors 22 and 24 are ninety degrees out-of-phase in time.

Another advantage of our novel systems, described above, is that they are capable of electrolytically generating a chemical disinfectant in situ; i.e., in reactors 22 and/or 24, to neutralize or destroy any unwanted microorganisms that might not be reached by the electrochemical neutralization process described above. More particularly, when operated within the parameters described above, systems such as that shown in the drawing are capable of electrolytically decomposing compositions containing biocidally effective halogens, typically chlorine or bromine, thereby introducing free bromine or chlorine into the fluid being treated. They are also capable of decomposing water being treated into biocidally active $O_2$ and $O_3$ oxidants.

Appropriate halogen compositions are described in the Oldershaw et al patent identified above and in U.S. Pat. No. 2,887,444 issued May 19, 1959, to Lindstaedt for PROCESSES OF AND MEANS FOR CHLORINATING SWIMMING POOLS OR THE LIKE.

If not already present as in applications where seawater or other saline solutions are involved, the compound employed to supply disinfectant can be introduced into the reactors 22 and 24 by metering or dosing it into flow conduits 32 and 30 as indicated schematically by arrows 70 and 72 in FIG. 1.

The efficacy of our novel method for treating aqueous fluids was demonstrated by tests conducted on seawater sewage contaminated with fecal coliforms in apparatus of the character described above with two serially connected reactors and a three gallon per minute throughput rate. Millipore and gas fermentation techniques, both conventional, were used to measure the decrease in live or active microorganisms affected in the reactors. Biological enummerations were made after holding the treated fluid for periods of 5, 10, 20, and 30 minutes.

Results of exemplary tests conducted in the manner just described are summarized in the following table.

TABLE 1

| RUN | A | | B | | C | |
|---|---|---|---|---|---|---|
| Salinity of Influent (%) | 2 | | 2 | | 2 | |
| Flow Rate (gpm) | 3 | | 3 | | 3 | |
| Residence Time (sec.) | 2 | | 2 | | 2 | |
| Polarizing Current (amps) | 10 | | 10 | | 10 | |
| Residual Current (amps) | 2 | 3 | 2 | 3 | 2 | 3 |
| Potential (volts) | 14.2 | 14.3 | 13.98 | 14.3 | 14.0 | 14.25 |
| Solids | 123 | 123 | 126 | 126 | 236 | 236 |

TABLE 1-continued

| RUN | A | | B | | C | |
|---|---|---|---|---|---|---|
| (ppm) COLIFORM COUNT | | | | | | |
| Initial | 800/ml (60,000/ml) | <200/ml (30,000/ml) | >2400/ml (8800/ml) | >2400/ml (7040/ml) | 5400/ml (7000/ml) | 5400/ml (4500/ml) |
| $T_5$ | 350/ml (600/ml) | 350/ml (400/ml) | 920/ml (TMTC) | >240/ml (18/ml) | — (18/ml) | — |
| $T_{10}$ | — | — | — | — | >2400/100ml (5/100ml) | 540/100ml (<5/100ml) |
| $T_{20}$ | — | — | — | — | 240/100ml (<5/100ml) | 5/100ml (<5/100ml) |
| $T_{30}$ | 2/ml (<200/ml) | <2/ml (<200/ml) | <2/100ml (<2/10ml) | <2/100ml (<1/10ml) | 13/100ml (<5/100ml) | <2/100ml (<5/100ml) |

*Upper figure is MPN (gas fermentation most probable number); lower figure is millipore generated count.

The data in Table 1 show not only that our process is extremely effective but that disinfection (neutralization of the coliforms) continued long after the fluid was discharged from the electrochemical reactors. This, attributable to the liberation of a biocidally active halogen in the reactors, and perhaps to the in situ generation of a biocidally active form of oxygen, are important, though perhaps subordinate to disinfection mechanisms, in sewage treatment and similar applications of our invention as was mentioned above and in other applications where contact disinfection is inhibited by a high solids content or for other reasons.

That a biologically active halogen capable of neutralizing harmful organisms can in fact be generated in accord with the principles of our invention was demonstrated in a single cell reactor of the characteristics, under the conditions, and with the results tabulated below.

TABLE 2

Reactor Volume = 9.63 cm³
Anode (or Cathode) Area = 106 cm²
Current = 1 amp = Current Density = $9.5^{ma}/cm^2$
Repolarization Current = 3 amps

| NACl Concentration in Influent, ppm (%) | Cell Voltage | *Oxidant in Effluent, ppm | Reactor Residence Time | Repolarization Time |
|---|---|---|---|---|
| 500 | 4.4 | 1.75, 1.8 | 2 sec. | ~1 sec. |
| 500 | 4.4 | 2.5, 2.6 | 4 sec. | |
| 500 | 4.4 | 1.0, 1.0 | 1 sec. | |
| 10,000 (1%) | 3.65 | 16, 18 | 2 sec. | 10.5 sec. |
| 10,000 (1%) | 3.65 | 21, 24 | 4 sec. | 8 sec. |

*Available free chlorine established with Hach DPD reagent.

Aside from demonstrating the halogen disinfectant generating efficacy of our process, the data also show that rapid repolarization can be employed to advantage in applications of our invention involving decomposable salt concentrations as low as 300 ppm. By employing this technique, a chlorine concentration well above that typically required by swimming pool ordinances was obtained, for example.

The several novel attributes of our invention identified above need not all necessarily be employed in concert. For example, in swimming pool applications, the use of two serially connected reactors may prove unnecessary. In these and other applications the minimum concentration of halogen disinfectant required by local and other regulations in the aqueous liquid may decrease the role of direct contact disinfection and generation of biocidally active forms of oxygen and put emphasis upon the generation of the halogen. In this case rapid polarization alone can typically be relied upon to reduce the dead time to a point where the generation of the halogen is sufficiently close to continuous to keep the concentration at the requisite level.

Our invention may also be embodied in many other forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by United States Letters Patent is:

1. A method of electrochemically treating aqueous fluids to neutralize or destroy harmful or otherwise unwanted microorganisms therein, said method comprising the steps of: passing said fluid between a pair of reversibly polarizable electrodes; applying a D.C. potential across said electrodes, said potential being maintained at a level which is effective to neutralize or destroy said organisms by contact with one of said electrodes and/or by the electrolytic generation of a chemical agent which is biocidally effective against said organisms; periodically reversing the polarity of said electrodes to chemically and/or biologically defoul them, the reversal of polarity being carried out by creating between said electrodes a flow of current exceeding that needed to maintain said electrodes at said effective level, thereby bringing about a rapid repolarization of said electrodes to said effective potential level; and thereafter maintaining the potential across said electrodes at the effective level until the next reversal of polarity by controlling the voltage applied across or the current density between said electrodes and allowing the other of said parameters to vary in proportion to the resistance between the electrodes.

2. A method of electrochemically treating aqueous fluids to neutralize or destroy harmful or otherwise unwanted microorganisms therein, said method comprising the steps of: passing said fluid between first and second pairs of reversibly polarizable electrodes; applying a D.C. potential across each pair of electrodes, said potential being maintained at a level which is effective to neutralize or destroy said organisms by contact with one of said electrodes and/or by the electrolytic generation of a chemical agent which is biocidally effective against said organisms; and periodically reversing the polarity of the electrodes of each said pair to chemically and/or biologically defoul them, the reversal of polarity across the two pairs of electrodes being so time phased that one of said pairs is always capable of functioning as aforesaid.

3. A method of electrochemically treating aqueous fluids to neutralize or destroy harmful or otherwise unwanted microorganisms therein, said method comprising the steps of: passing said fluid between a pair of reversibly polarizable electrodes; applying a D.C. potential across said electrodes, said potential being maintained at a level which is effective to neutralize or destroy said organisms by contact with one of said electrodes and/or by the electrolytic generation of a chemical agent which is biocidally effective against said organisms; and introducing into said liquid a composition that is electrolytically decomposable at the potential maintained across the electrodes to furnish said chemical agent in an available form to the fluid being treated, said method also including the steps of: periodically reversing the polarity of said electrodes to chemically and/or biologically defoul them, the reversal of polarity being carried out by creating between said electrodes a flow of current exceeding that needed to maintain said electrodes at said effective potential level, thereby bringing about a rapid repolarization of said electrodes to said effective level; and thereafter maintaining the potential across said electrodes at the effective level until the next reversal of polarity by controlling the voltage applied across or the current density between said electrodes and allowing the other of those parameters to vary in proportion to the resistance between the electrodes.

4. A method as defined in claim 2 wherein the reversal of polarity is carried out by creating between the electrodes of each said pair a flow of current exceeding that needed to maintain the potential therebetween at said effective level, thereby bringing about a rapid repolarization of the electrodes of said pair to said effective potential level and thereby making them capable of functioning as aforesaid; and thereafter maintaining the potential across said electrodes at the effective level until the next reversal of polarity by controlling the voltage across or the current density between said electrodes and allowing the other of those parameters to vary in proportion to the resistance between said electrodes.

5. A method as defined in claim 2 in which the reversal of polarity of the two pairs of electrodes is effected on the order of 90 degrees out-of-phase.

6. A method as defined in any of the preceding claims 1, 3, or 5 in which the potential across said electrodes is maintained at a level of 3.5 to 4.4 volts.

7. A method as defined in any of the preceding claims 1, 3, or 5 in which the current density is maintained at a level of 0.01 to 0.016 amps/cm$^2$.

8. A method as defined in any of the preceding claims 1, 3, or 6 in which the reversal of potential is effected about every 2.5 to 5 minutes.

9. A method as defined in any of the preceding claims 1, 3, or 6 in which the current density between said electrodes is maintained at a level of 0.03 to 0.05 amps/cm$^2$ during said rapid repolarization and then reduced to a level of 0.01 to 0.016 amps/cm$^2$ until the next reversal of potential is effected.

10. A method as defined in claim 9 wherein said current density is maintained at said level of 0.03 to 0.05 amps/cm$^2$ for a period of 1 to 45 seconds.

* * * * *

UNITED STATES PATENT AND TRADEMARK OFFICE
CERTIFICATE OF CORRECTION

PATENT NO. : 4,384,943

DATED : May 24, 1983

INVENTOR(S) : GLENN E. STONER; LOUIE L. SCRIBNER, JR.; GEORGE L. CAHEN, JR.

It is certified that error appears in the above-identified patent and that said Letters Patent is hereby corrected as shown below:

Column 2, line 25, "as" should be --at--.

Column 6, line 11, "whereby" should be --thereby--.

Signed and Sealed this

Ninth Day of August 1983

[SEAL]

Attest:

GERALD J. MOSSINGHOFF

Attesting Officer     Commissioner of Patents and Trademarks